(12) United States Patent
Ponnuswamy

(10) Patent No.: US 7,840,850 B2
(45) Date of Patent: Nov. 23, 2010

(54) DATA PROCESSING SYSTEM FOR LOGGING MEMORY ACCESS DATA

(75) Inventor: Basker Ponnuswamy, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 565 days.

(21) Appl. No.: 11/911,317

(22) PCT Filed: Apr. 11, 2005

(86) PCT No.: PCT/IN2005/000107

§ 371 (c)(1),
(2), (4) Date: Oct. 11, 2007

(87) PCT Pub. No.: WO2006/123351

PCT Pub. Date: Nov. 23, 2006

(65) Prior Publication Data

US 2009/0228743 A1    Sep. 10, 2009

(51) Int. Cl.
*G06F 11/00* (2006.01)
(52) U.S. Cl. .................... 714/45; 714/48; 711/207
(58) Field of Classification Search ............ 714/45, 714/47, 48; 711/207; 211/206, 207
See application file for complete search history.

(56) References Cited

U.S. PATENT DOCUMENTS

| | | | |
|---|---|---|---|
| 5,293,612 A * | 3/1994 | Shingai | 711/159 |
| 6,047,354 A | 4/2000 | Yoshioka et al. | |
| 6,341,357 B1 | 1/2002 | Ravichandran | |
| 6,430,667 B1 * | 8/2002 | Loen | 711/202 |
| 7,437,524 B2 * | 10/2008 | Narayan et al. | 711/161 |
| 2005/0033931 A1 * | 2/2005 | Richard et al. | 711/162 |
| 2008/0183931 A1 * | 7/2008 | Verm et al. | 710/260 |
| 2009/0228743 A1 * | 9/2009 | Ponnuswamy | 714/48 |

FOREIGN PATENT DOCUMENTS

WO    WO-01/97043    12/2001

* cited by examiner

*Primary Examiner*—Philip Guyton

(57) ABSTRACT

A data processing system for logging memory access data; the data processing system having a memory management unit to support a virtual memory environment having a first data structure to store address translation data (VPN1 . . . VPNN, PPN1 . . . PPNn) to relate a virtual address to a corresponding physical address of a physical memory; a page fault/TLB miss handler to store page fault data, associated with the page fault, in a second data structure in response to a page fault; and a dump manager to store, in response to an event, memory access data derived from the physical memory according to at least a portion of the page fault data.

16 Claims, 3 Drawing Sheets

DATA PROCESSING SYSTEM FOR LOGGING MEMORY ACCESS DATA

CROSS-REFERENCE TO RELATED APPLICATIONS

The present Application is based on International Application No. PCT/IN2005/000107, filed Apr. 11, 2005 and priority is hereby claimed under 35 USC §119 based on this application. This application is hereby incorporated by reference in its entirety into the present application.

FIELD OF THE INVENTION

The present invention relates to a data processing system and method.

BACKGROUND TO THE INVENTION

From time to time, computer systems are known, for whatever reason, to crash. Most commercial operating systems comprise a facility for writing the content of memory prevailing at the time of a hardware or software crash to a nonvolatile storage such as, for example, an HDD. This is known within the art as a memory dump. Microsoft Windows XP, for example, can be configured to write debugging information to three different file formats, which are known as memory dump files, when a computer unexpectedly stops. The three types of memory dump are known as (1) a complete memory dump, (2) a kernel memory dump and (3) a small memory dump.

A complete memory dump records all content of the system memory when the computer unexpectedly stops. One skilled in the art understands that such a complete memory dump requires a paging file that is sufficient to hold the content of the physical RAM plus additional space to store metadata for reading the dump.

A kernel memory dump is arranged in response to the computer stopping unexpectedly to record only the content of the kernel memory. It will be appreciated that this reduces the time taken to record debugging information as compared to the complete memory dump. One skilled in the art appreciates that the kernel memory dump requires (1) an amount of storage space on the HDD that is greater than the size of the kernel occupied memory, (2) a paging file of at least one third of the size of the physical memory of the computer and (3) extra space for metadata to be available on the dump volume, that is, the volume on which such a memory dump is stored. It will be appreciated that the kernel memory dump does not include the content of unallocated memory or any memory that is allocated to user mode programs. It includes only memory that is allocated to the kernel and memory allocated to kernel mode drivers and other kernel mode programs. As compared to the complete memory dump, the kernel memory dump is significantly smaller and represents an attempt to omit the need to record data for those parts of memory that are unlikely to have been the cause of, or to be associated with, the crash.

A small memory dump is arranged to record a much smaller set of useful information to help identify the reason behind the system crash. Typically, a small memory dump requires a paging file of approximately 2 MB on the dump volume.

One skilled in the art appreciates that the physical memory capacity of computers can be substantial. For high-end configurations, systems are available with many gigabytes of memory and some systems comprise terabytes of physical memory. It will be appreciated that the write times of HDDs are significantly slower than the write times for physical memory. Therefore, for a machine with about 256 GB of physical memory, it can take many hours to perform a memory dump in response to a system stopping unexpectedly, during which the machine might be unavailable. It will be appreciated that it is unacceptable within today's commercial computing environment to have such high-end hardware or computing facilities unavailable for such significant periods of time.

It is an object of the present invention to at least mitigate one or more of the problems of the prior art.

SUMMARY OF THE INVENTION

Accordingly, a first aspect of the present invention provides a data processing system for logging memory access data; the data processing system comprising a memory management unit to support a virtual memory environment comprising a first data structure to store address translation data to relate a virtual address to a corresponding physical address of a physical memory;

a page fault/TLB miss handler to store page fault data, associated with the page fault, in a second data structure in response to a page fault; and a dump manager to store, in response to an event, memory access data derived from or at least associated with the physical memory according to at least a portion of the page fault data.

Advantageously, embodiments of the present invention reduce the amount of information that needs to be stored to analyse or identify the cause of an unexpected system stop or crash. Furthermore, embodiments may also realise a reduction in the downtime associated with the system experiencing the stop or crash.

In preferred embodiments of the present invention, the first data structure is a translation lookaside buffer.

Embodiments provide a data processing system in which the page fault/TLB miss handler is operable to store at least one of following page fault data (a) at least a portion of the address translation data associated with the page fault, (b) the virtual address or a virtual page number of the virtual address associated with the page fault, or (c) the physical address or physical page number associated with the page fault, which are realisations of memory access data.

Preferably, embodiments of the present invention provide a data processing system in which the page fault/TLB miss handler comprises a filter to store selectable page fault data in the second data structure. Suitably, the amount of data that needs to be stored to analyses and possibly recover from, an unexpected system stop can be further reduced by logging only predetermined types of, for example, physical pages associated with the pages identified in the translation lookaside buffer entry log.

In preferred embodiments, the selectable page fault data comprises data associated with at least one of (a) a kernel memory, (b) a kernel stack, (c) a page table, (d) a system pages, (e) a process table, (f) TLB insertion data, and (g) TLB purge data.

Embodiments provide a data processing system in which the dump manager is operable to store selectable categories of memory access data. Preferably, the selectable categories of memory access data comprise data associated with at least one of (a) a kernel memory, (b) a kernel stack, (c) a page table, (d) a system page, and (e) a process table.

Embodiments provide a data processing system in which the dump manager is operable to store at least one of (a) at least a portion of the address translation data associated with the page fault, (b) the physical address (122) or physical page number associated with the page fault, and (c) at least one unit of the physical memory associated with the page fault. Preferably, the unit of the physical memory is a page of memory. The page may comprises, for example, 4K, 8K, 64K or any other convenient page size or combination of page sizes, that is, multiple pages sizes may be used.

In preferred embodiments, the event comprises at least one of (a) an access to non-volatile storage and (b) an exception event. Preferably, the exception event is a system stop or other crash or any other event or exception such as, for example, a panic, an abnormal memory access, operation or violation or an abnormal program operation or termination.

Optionally, the second data structure may form a part of the first data structure.

It will be appreciated that embodiments of the present invention can be realised in the form of hardware, in the form of software or in the form of a combination of both hardware and software. Accordingly, embodiments of the present invention provide a processor comprising a data processing system as claimed or described in this specification.

Embodiments of the present invention provide a memory management assembly or chip comprising a data processing system as claimed or described in this specification.

It will be realised that embodiments of the present invention can also be implemented, at least in part, by software. The software may be stored in a nonvolatile manner such as, for example, on a nonvolatile storage medium or in a nonvolatile storage unit or device such as a chip, ROM or other nonvolatile memory. Suitably, embodiments of the present invention provide a computer program comprising computer executable code to implement a system or method described or claimed in this specification. Furthermore, embodiments of the present invention provide a computer program product comprising storage storing such a computer program.

BRIEF DESCRIPTION OF THE DRAWINGS

Embodiments of the present invention will now be described, by way of example only, with reference to the accompanying drawings in which.

DESCRIPTION OF THE PREFERRED EMBODIMENTS

Figure 1:
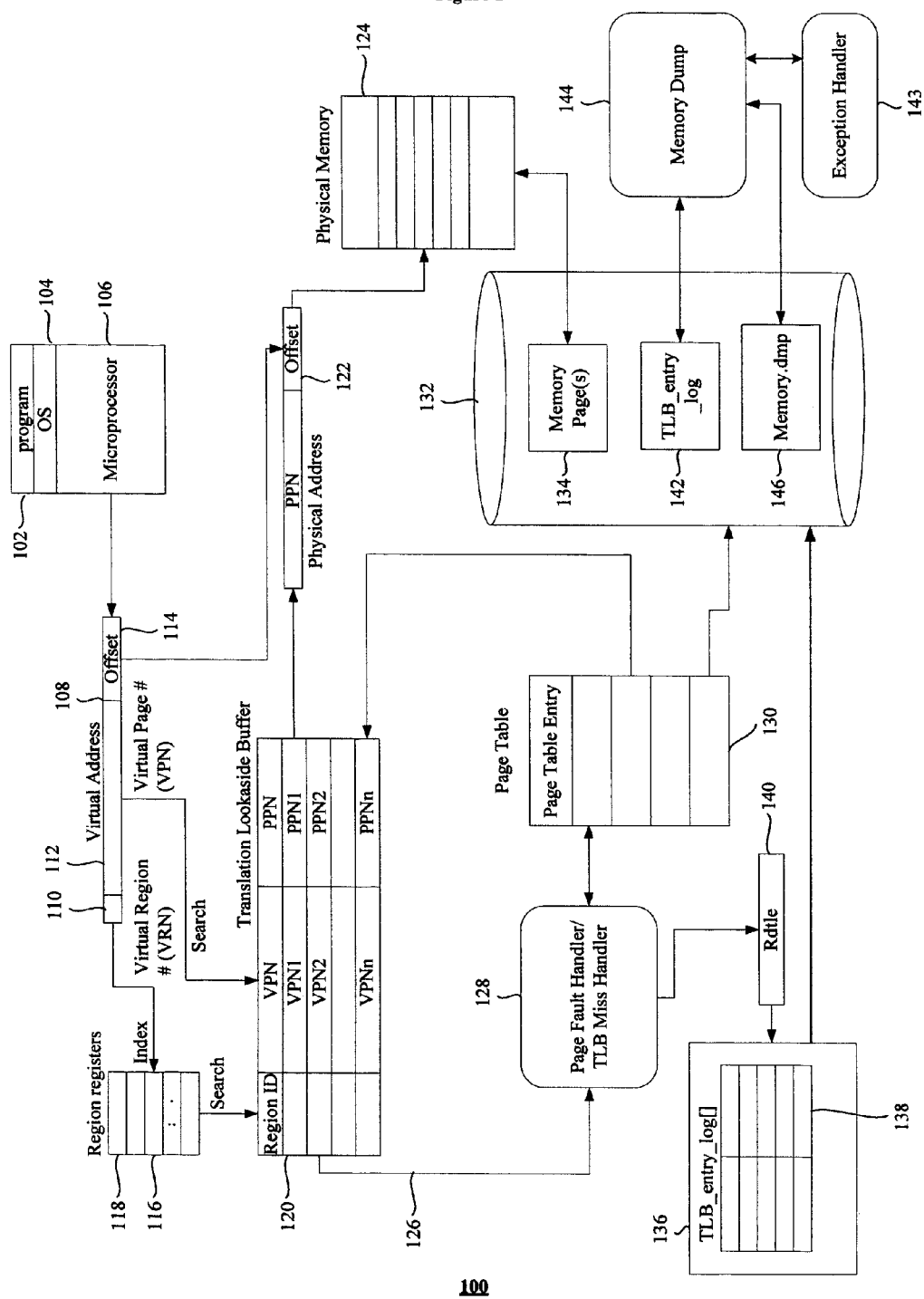
FIG. 1 shows a portion of a computer system comprising a virtual memory management system according to an embodiment of the present invention.

Referring to FIG. 1, there is shown a portion of a computer system 100 for supporting at least crash analysis according to an embodiment of the present invention. The portion of the computer system 100 relates to implementation of a virtual memory management system. Typically, a program 102, running on top of an operating system 104, which, in turn, runs on top of a microprocessor 106, performs an operation in relation to a virtual address 108. The virtual address comprises three portions, which are (1) the virtual region number VRN, (2) a virtual page number, VPN, and (3) an offset. It will be appreciated that the portions represent realisations of portions of address translation data. The virtual region number 110 is used as an index to retrieve a region ID 116 from a bank of region registers 118.

The virtual memory is implemented using a translation lookaside buffer (TLB) 120, which comprises a number of TLB entries. The TLB 120 is arranged to map an indexed region ID 116 and a virtual page number (VPN) 112 to a physical page number (PPN). The physical page number corresponding to the virtual address 108 is combined with the offset 114 to produce a physical address 122 corresponding to the virtual address 108. The physical address 122 is used to access a physical memory 124 where the data or instruction sought by the program or operating system should be stored.

If a TLB miss occurs, which provides an indication that the TLB 120 does not contain a physical page number corresponding to the virtual address 108, a TLB miss 126 is generated. In one embodiment, the TLB miss 126 is handled by a page fault/TLB miss handler 128. The page fault/TLB miss handler 128 is arranged, firstly, to access a page table 130, comprising a number of page table entries, in an attempt to locate translation data to be transferred into the TLB 120. If such data exists within the page table 130, that entry is copied into the TLB 120 and used to construct the physical address 122 corresponding to the virtual address 108.

If the page fault/TLB miss handler 128 determines that the page table 130 does not contain translation data corresponding to the virtual address 108, a page table miss is deemed to have occurred, which means that the page of physical memory corresponding to the virtual address 108 will have been written to nonvolatile storage such as, for example, an HDD 132. It will be appreciated that alternative embodiments can be realised in which the HDD is replaced or supplemented by other nonvolatile storage like flash memory, EEPROM memory or any other nonvolatile storage. Usually, an indication that a physical page of memory is no longer resident within the physical memory of the computer system is provided using a valid/invalid bit (not shown). The HDD 132 comprises at least one memory page 134 and, usually, a number of such pages. If a physical page of memory is required to service or meet the needs of a virtual address under such circumstances, that physical page of memory is transferred from the HDD 132 to the physical memory 124.

The page fault/TLB miss handler 128 is also arranged to construct a data structure 136 for storing TLB data 138 associated with operations performed in relation to the TLB 120. In preferred embodiments, the data 138 comprises translation data. It will be appreciated by one skilled in the art that entries within the TLB 120 are filled and purged according to the needs of the computer system 100. The page fault/TLB miss handler 128 is arranged to store data associated with a purged TLB entry within the data structure 136. According to an embodiment, the page fault/TLB miss handler 128 is arranged to execute a predetermined instruction that is arranged to store the information relating to the purged, that is, replaced or removed, TLB entry within an associated special purpose register 140. The special purpose register is known as Rdtlbe, which stands for "Register for Deleted TLB entry". The predetermined instruction represents a modification of an existing "Insert TLB Entry" instruction such that, when executed, the TLB entry to be replaced or removed from the TLB 120 is stored within the special purpose register 140. It will be appreciated that the data stored within the TLB entry log structure 136 represents a realisation of memory access data.

Alternatively, embodiments can be realised in which a new instruction, "GetReplaceableTLBEntry", abbreviated as GRTLBE, is arranged to store the TLB entry associated with the TLB miss or page fault within the register 140. Each time a TLB miss occurs, the content of that register 140 is stored within the TLB entry log, that is, the data structure 136 for subsequent use in performing a memory dump in response to an unexpected system stop.

In preferred embodiments, the page fault/TLB miss handler, especially in relation to software managed TLBs, is arranged to log the page fault table entry stored within the page table 130, whose translation data is written to the TLB 120, as well as the TLB entry to be purged from the TLB 120, that is, both translations are written to the data structure 136.

Therefore, it will be appreciated that the TLB entry log 136 represents a collection of memory access data, that is, pages or associated translation data for which TLB operations have been performed of for which TLB events have occurred.

When a page table miss occurs, as indicated above, the physical page corresponding to the miss is swapped from the HDD 132 into the physical memory 124. During such a disc access, the TLB entry log 136 is written to the HDD 132 in the form of a TLB entry log file 142, if the TLB entry log 136 overflows. In preferred embodiments, a number of such TLB entry logs or data structures are written to the file 142 in a circular manner, which limits the size of the TLB entry log file 142.

In response to an unexpected system stop, an exception handler 143 is arranged to invoke a program 144 for dumping selected pages of the physical memory 124 to the HDD 132 in the form of a memory dump file 146. It will be appreciated that the program 144 represents a, or at least part of a, realisation of a dump manager, taken either alone or in conjunction with support hardware or software such as, for example, the exception handler 143.

The operation of the program 144 will now be described. In preferred embodiments, the TLB entry log 136 is scanned or traversed to identify physical pages to be written by the program 144 to the memory dump file 146. A number of techniques can be used to select those physical pages to be written to the memory dump file 146. Embodiments can be realised in which all physical pages associated with the entries in the TLB entry log 136 or 142 are written to the memory dump file 146. However, in preferred embodiments, intelligent decisions can be made in relation to the entries 138 within the TLB entry log 136 or 142 to reduce the amount of information to be written to the memory dump file 146, which will, in turn, further reduce the time taken to write, and the storage space needed to store, the memory dump file 146. For example, predetermined or selectable types of physical pages associated with the entries 138 can be identified. In preferred embodiments, the predetermined or selectable types of physical pages may correspond to those physical pages associated with, for example, at least one of the kernel stack, the page table 130, a process table or any other system pages. Alternatively, techniques such as the Most Recently Used or the Most Frequently Used memory management techniques could be employed to select physical pages corresponding to the entries 138 contained within the TLB entry log 136 to be written to the memory dump file 146.

It will be appreciated by those skilled in the art that creating a memory dump file 146 of physical pages prevailing at the time of the system stop, that is, physical pages that were being written to or accessed, may provide a reasonable basis for performing a system stop or crash analysis to determine the cause of the problem.

Figure 2:
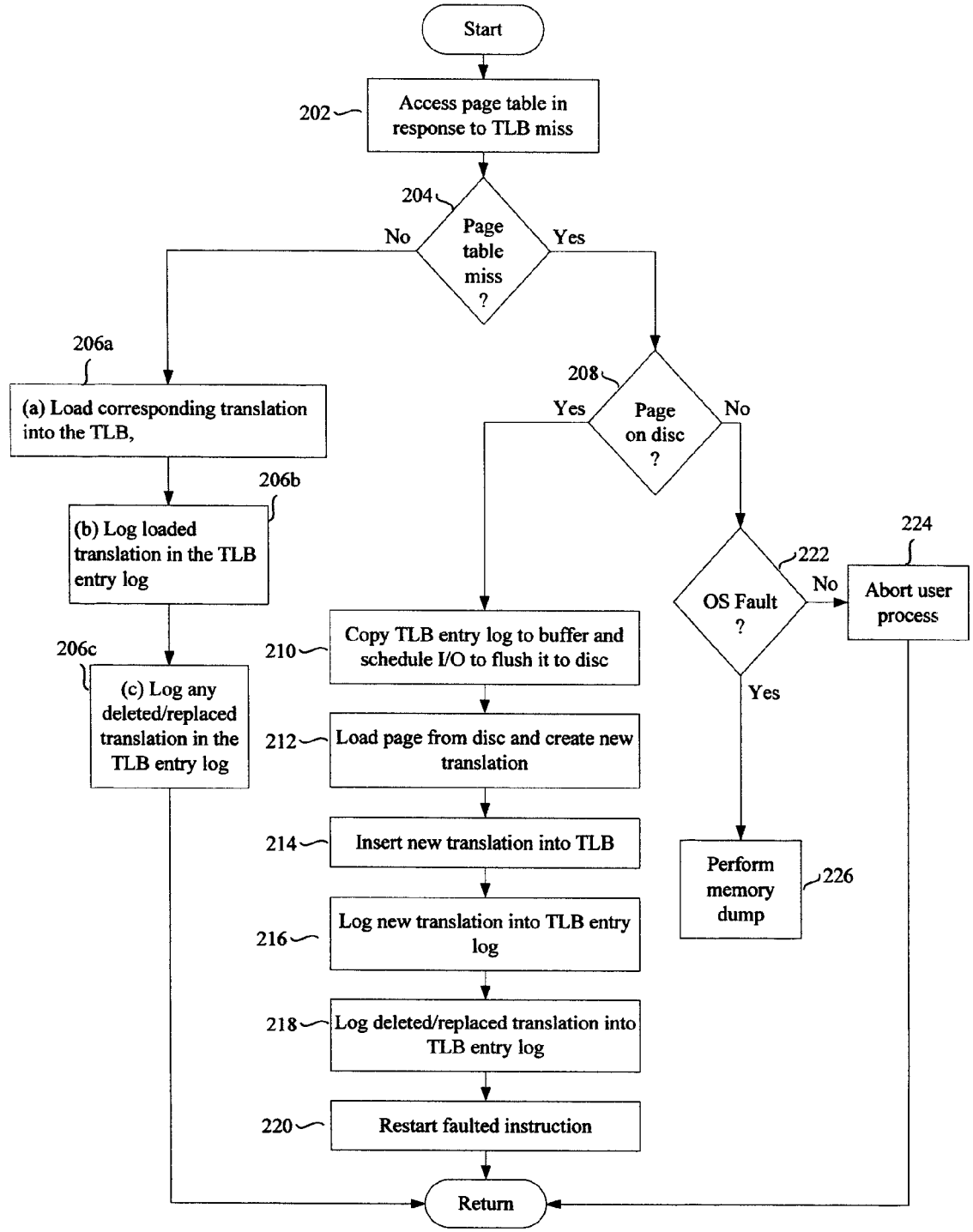
FIG. 2 shows a flowchart of the operation of the virtual memory management system according to an embodiment of the invention.

Referring to FIG. 2, there is shown a flowchart 200 relating to the operation of the virtual memory environment 100 according to an embodiment of the present invention. At step 202, in response to a TLB miss, the page table 130 is accessed by the page fault/TLB miss handler 128. A determination is made, at step 204, as to whether or not a page table miss has occurred. If a page table miss has not occurred, control transfers to step 206a, where the translation data corresponding to the TLB miss is loaded into the TLB 120 using a corresponding page table entry. Data associated with loading the translation into the TLB 120 is added, as a TLB entry, into the TLB entry log 136 at step 206b. Furthermore, if it was necessary to delete or purge a translation from the TLB 120 to accommodate the translation recently obtained from the page table 130, data associated with that deleted or purged translation is also added to the TLB entry log 136 at step 206c. Thereafter, processing resumes, that is, the processor, in hardware realisations, resumes from the point immediately before the exception occurred or any other convenient point or hardware or, in software realisations, control is returned from the function, subroutine or interrupt service routine, represented by FIG. 2, called in response to the TLB miss. The data associated with the deleted or purged translation may also comprise a copy of the translation data itself or some other data derived from it to allow, for example, at least one of the physical or virtual page(s) or address(es) associated with the fault or crash to be identified.

If it is determined, at step 204, that a page table miss has occurred, a determination is made, at step 208, as to whether or not the physical page corresponding to the virtual address 108 that gave rise to the TLB miss or the page table miss, is stored on the HDD 132. It will be appreciated by those skilled in the art that such a determination is usually achieved using valid/invalid bits associated with each entry in the page table 130. However, for the purpose of clarity, such valid/invalid bits have not been shown.

If, at step 208, it is determined that the desired page is on disc processing continues at step 210, a copy of the TLB entry log 136 is written to the HDD 132 in the form of a TLB entry log file 142. The desired page, that is, the physical page corresponding to the virtual address causing the fault, is loaded from the memory pages 134 into the physical memory 124 and a new translation between that virtual address and the page of physical memory is created at step 212. At step 214, the new translation is loaded into the TLB 120. Also, at step 216, the translation is copied into the TLB entry log 136. Again, if it was necessary to purge or delete a TLB entry from the TLB 120 to accommodate the newly created TLB translation, that deleted or purged translation is also copied to the TLB entry log 136 at step 218. At step 220, the instruction causing the memory fault is restarted.

However, if it is determined, at step 208, that the page corresponding to the defaulting virtual address is not stored on the HDD 132, a determination is made at step 222 as to whether or not an OS fault has occurred. If the determination at step 222 is that an OS fault has not occurred, the user process that generated the page fault or the TLB miss is aborted at step 224. Therefore, only the process that generated the fault is terminated by, for example, sending a segmentation violation signal for UNIX/BSD style operating systems. Thereafter, as indicated above, processing resumes as appropriate.

If the fault was an OS fault, a memory dump, in accordance with embodiments of the present invention, that is, using the TLB entry log 136, is commenced at step 226. Thereafter, subsequent processing will depend on the nature of the fault. For example, in some instances, it may be necessary to reboot the computer. In other circumstances, a reboot may not be necessary.

Figure 3:
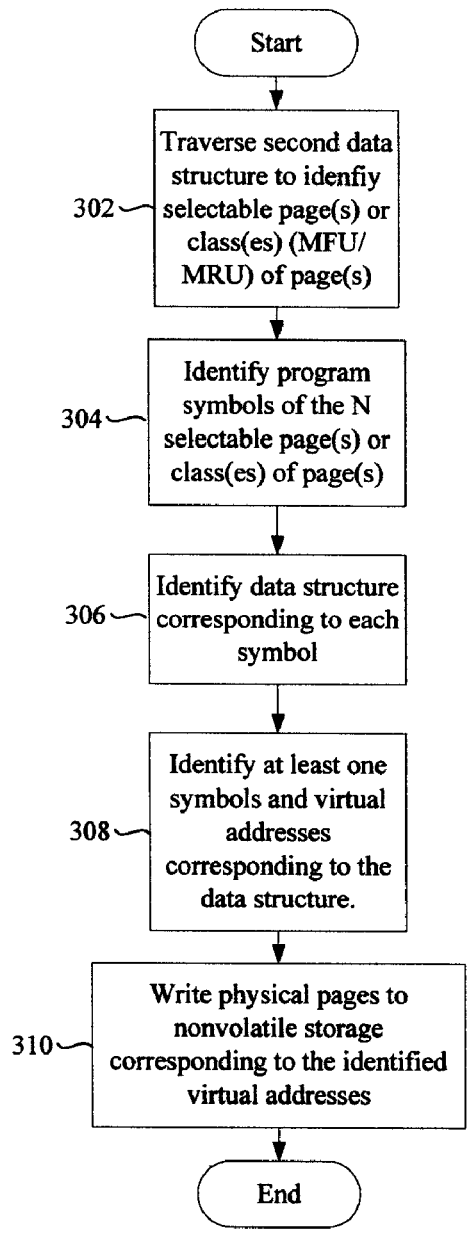
FIG. 3 depicts a flowchart of dynamic program slicing according to an embodiment of the invention.

Referring to FIG. 3, there is shown a flowchart 300 for obtaining a data slice in relation to dynamic program slicing according to an embodiment of the present invention. It will be appreciated that, in this embodiment, a virtual page number is stored in the TLB entry log 136. At step 302, the TLB entry data structure 136 is traversed to identify data associated with selectable pages or selectable classes of pages. In preferred embodiments, pages of the selectable class or classes of pages are those that were the most frequently used or the most recently used or a number of such pages, that is, the N most frequently used or the N most recently used pages, where N is user configurable and, or such that, the user can set the size of the data slice required. Symbols corresponding to the N pages of such pages are identified at step 304. The identified program symbols are used to identify corresponding data structures at step 306. At step 308, the identified data structures are used to identify one or more and, preferably, most, and more preferably all, symbols and virtual addresses corresponding to the identified data structure(s). At step 310, the physical pages corresponding to the identified virtual addresses are written to nonvolatile storage, that is, to the memory dump file 146.

Although the above embodiments have been described with reference to the data structure 136 storing the least part of, or the whole of, a TLB entry, embodiments are not limited such an arrangement. Embodiments can be realised in which the data structure 136 is arranged to store the physical page numbers corresponding to changes associated with the TLB 120, that is, the physical page in respect of which an entry is to be written to the TLB and the physical page in respect of which an entry is to be purged from the TLB.

Embodiments of the present invention have been described above with reference to the data structure entries 138 corresponding to all physical pages associated with TLB operations. However, it will be appreciated that embodiments can be realised in which the data structure 136 contains entries corresponding to physical and virtual pages or addresses of a selectable type. In effect, for example, only selected physical pages, or TLB entries corresponding to such selected physical pages, are stored within the data structure 136 for subsequent analysis following system stop or system crash. For example, TLB entries corresponding to TLB insertions, or to physical pages corresponding to such TLB insertions, are stored within the data structure 136. Still further, the selected physical pages, or their TLB entries, may correspond to those pages that are likely to provide an indication of the source or reason for a system stop or system crash. Such selected pages may comprise, for example, physical pages associated with the page table, a process table, a kernel stack or any other system pages.

Alternative embodiments can be realised in which the data structure 136 forms part of the TLB 120, or, at least, is stored within the memory associated with the TLB 120. Under such an arrangement, rather than the page fault/TLB miss handler 128, in conjunction with the special-purpose register 140 of the microprocessor 106, performing the logging of TLB entries or associated physical pages, or both, within the data structure 136, the TLB 120 itself can be responsible for maintaining that information.

Embodiments of the present invention can be realised in which the arrangement shown in FIG. 1 is duplicated for each program executed by the microprocessor 106, or the arrangement is duplicated for each microprocessor of a multiprocessor system.

Still further, embodiments can be realised in which the memory dump file 146 is performed or constructed on-the-fly in relation to the page fault/TLB miss handler 128 detecting page faults.

It will be appreciated by those skilled in the art that the above embodiments are arrangement is equally applicable to instruction TLBs and data TLBs.

The above embodiments have been described with reference to the page fault/TLB miss handler performing the function of handling page table faults and TLB misses. However, embodiments can be realised in which handling page table faults and handling TLB misses are achieved using respective hardware or software entities such as, for example, separate page table fault and TLB miss handlers.

It will be appreciated that the above embodiment uses a program 144 as a dump manager. However, embodiments can be realised in which the dump manager is realised in the form of hardware or a combination of hardware and software.

The above embodiments have been described with reference to the memory access data being saved by the dump manager in a memory dump file. Alternative embodiments can be realised in which the data representing the memory dump is not saved as part of the OS file system. Embodiments can be realised in which the data is saved directly onto disc rather than via the file system. This has the advantage of the data still being accessible in the event of the OS file system not being accessible.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A computer readable storage medium comprising instructions that when executed cause a data processing system to perform a method for logging memory access data, said instructions comprising:
    code for a memory management unit to support a virtual memory environment, said memory management unit comprising a first data structure to store address translation data, VPN1 . . . VPNN, PPN1 . . . PPNn, said address translation data enabling relating a virtual address to a corresponding physical address of a physical memory;
    code for a page fault/TLB miss handler to store page fault data, associated with a page fault, in a second data structure in response to the page fault; and
    code for a dump manager to store, in response to an event, memory access data derived from the physical memory according to at least a portion of the page fault data.

2. The instructions as claimed in claim 1 in which the first data structure is a translation lookaside buffer (TLB).

3. The instructions as claimed in claim 1 in which the page fault/TLB miss handler is operable to store at least one of following page fault data:
   (a) at least a portion of the address translation data associated with the page fault,
   (b) the virtual address or a virtual page number, (VPN1 . . . VPNn), of the virtual address associated with the page fault,
   (c) the physical address or physical page number, PPN1 . . . PPNn, associated with the page fault, and
   (d) at least one unit of the physical memory associated with the page fault.

4. The instructions as claimed in claim 3 in which the page fault/TLB miss handler comprises a filter to store selectable page fault data in the second data structure.

5. The instructions as claimed in claim 1 in which the page fault/TLB miss handler comprises a filter to store selectable page fault data in the second data structure.

6. The instructions as claimed in claim 5 in which the selectable page fault data comprises data associated with at least one of (a) a kernel memory, (b) a kernel stack, (c) a page table, (d) a system page, (e) a process table, (f) TLB insertion data, and (g) TLB purge data.

7. The instructions as claimed in claim 5 in which the event comprises at least one of
   (a) an access to non-volatile storage and
   (b) an exception event.

8. The instructions as claimed in claim 7 in which the exception event is a system stop or other crash.

9. The instructions as claimed in claim 5 in which the second data structure forms a part of the first data structure.

10. The instructions as claimed in claim 5 in which the dump manager is operable to store selectable categories of memory access data.

11. The instructions as claimed in claim 1 in which the dump manager is operable to store selectable categories of memory access data.

12. The instructions as claimed in claim 11 in which the selectable categories of memory access data comprises data associated with at least one of (a) a kernel memory, (b) a kernel stack, (c) a page table, (d) a system page, and (e) a process table.

13. The instructions as claimed in claim 12 in which the dump manager is operable to store at least one of
   (a) at least a portion of the address translation data associated with the page fault,
   (b) the virtual address or a virtual page number, VPN1 . . . VPNn, of the virtual address associated with the page fault,
   (c) the physical address or physical page number, PPN1 . . . PPNn, associated with the page fault, and
   (d) at least one unit of the physical memory associated with the page fault.

14. The instructions as claimed in claim 1 in which the dump manager is operable to store at least one of
   (a) at least a portion of the address translation data associated with the page fault,
   (b) the virtual address or a virtual page number, VPN1 . . . VPNn, of the virtual address associated with the page fault,
   (c) the physical address or physical page number, PPN1 . . . PPNn, associated with the page fault, and
   (d) at least one unit of the physical memory associated with the page fault.

15. A processor comprising the data processing system as claimed in claim 1.

16. A memory management assembly or chip comprises the instructions as claimed in claim 1.

* * * * *